United States Patent [19]

Lewis

[11] Patent Number: 4,896,528
[45] Date of Patent: Jan. 30, 1990

[54] TANK BOTTOM LEAK TESTING AND APPARATUS

[76] Inventor: Donald E. Lewis, 7714 Moritz Lake Dr., Corpus Christi, Tex. 78413

[21] Appl. No.: 121,662

[22] Filed: Nov. 16, 1987

[51] Int. Cl.[4] .......................... G01M 3/20; G01M 3/32
[52] U.S. Cl. ........................................ 73/40.7; 73/49.2
[58] Field of Search ............. 73/49.2 T, 40.1, 40.5 R; 340/605; 138/97

[56] References Cited

U.S. PATENT DOCUMENTS

| | | | |
|---|---|---|---|
| 3,209,343 | 9/1965 | Dunham et al. | 340/237 |
| 3,505,820 | 4/1970 | Draper et al. | 61/1 |
| 3,995,472 | 12/1976 | Murray | 73/40 |
| 4,404,516 | 9/1983 | Johnson, Jr. | 73/40.5 R X |
| 4,404,844 | 9/1983 | Hegler | 73/49.2 |
| 4,598,277 | 7/1986 | Feldman | 340/605 X |
| 4,602,250 | 7/1986 | Peace | 340/605 |
| 4,618,855 | 10/1986 | Harding et al. | 340/605 |
| 4,644,354 | 2/1987 | Kidd | 340/870.27 |
| 4,653,312 | 3/1987 | Sharp | 73/49.2 |
| 4,682,492 | 7/1987 | Green | 73/49.2 |
| 4,725,551 | 2/1988 | Thompson | 73/40.7 X |
| 4,770,028 | 9/1988 | Flippo, Jr. | 73/40.7 |

FOREIGN PATENT DOCUMENTS

| | | | |
|---|---|---|---|
| 1804441 | 5/1970 | Fed. Rep. of Germany | 73/49.2 |
| 2534832 | 2/1976 | Fed. Rep. of Germany | 73/49.2 |
| 52-7787 | 1/1977 | Japan | 73/40.7 |
| 54-121413 | 9/1979 | Japan | 73/49.2 |
| 311091 | 5/1969 | Sweden | 73/49.2 |

Primary Examiner—Michael J. Tokar
Assistant Examiner—Joseph W. Roskos
Attorney, Agent, or Firm—Head & Johnson

[57] ABSTRACT

Method and apparatus are described for detecting the leakage of fluid under storage tanks. A number of parallel perforated test conduits are placed under the tank which is to be tested for leaks. A vacuum is placed on the test conduits to remove gas and liquid, if any, from the soil beneath the tank. If no gas or liquid is found it indicates that there is no leak. If gas or liquid is found, small test areas are isolated under the tank. The isolated areas may be placed under vacuum or pressure so gas and/or liquid can flow therethrough under pressure so that analysis of the flow in or flow out of the test conduit can be made to determine if that isolated area has leakage. The isolated areas can be changed until the isolated area with the leak is found.

13 Claims, 8 Drawing Sheets

TANK BOTTOM LEAK TESTING AND APPARATUS

BACKGROUND OF THE INVENTION

This invention relates to the area of testing soil beneath storage tanks to determine if there are any leaks in the storage tank.

One of the most common ways of storing hydrocarbon, such as crude oil, gasoline and so forth is in large steel storage tanks which are normally cylindrical shape with the bottom resting on the soil. The particular soil is usually some material which will be least likely to cause corrosion of the bottom. This material includes clean river sand or clean washed crushed rock. Many precautions are made to improve the engineering of these tanks to prevent them from leaking. However, despite all of this effort these tanks do develop leaks. These leaks are harmful in at least two ways: (1) They can cause pollution of the underground soil and possibly underground water sources; and (2) the loss of the material itself is loss of a natural resource and this can also be costly in terms of dollars. For example, if one tank leaks more than two barrels of gasoline per day the loss would be more than 30,000 gallons per year. These tanks may be 100 to 200 feet in diameter and may contain upward to 100,000 or more barrels of fluid. If there are 25 such tanks in a tank farm then there could be a leakage of as much as 750,000. to 2,000,000 gallons of gasoline per year. There is presently no reliable way of detecting leaks under and in the bottom of these large tanks and further no way of determining the actual location or of repairing them while the tank is in service.

SUMMARY OF THE INVENTION

I use gas as a testing median to (1) determine if a tank is leaking; and (2) if it is leaking, to detect where the leak actually is and the approximate size. I then have a method of repairing the leak.

A plurality of perforated test conduits are installed beneath the bottom of a storage tank. The test conduits are preferably parallel. Each test conduit has perforations which are approximately the same distance apart and the perforations are so aligned that there is a grid defined by the test conduits and lined up perforations so that the area of the tank bottom is covered by the grid and divided into well defined areas. Special piston valves and hollow lances may be inserted in any selected test conduit which in effect isolates selected perforations which are placed in fluid communication with test equipment exterior to the tank. This allows gas tests of positive and negative pressure areas to be generated at specific locations in the soil below the tank. A lance is defined as a hollow pipe that can conduit fluid to a selected location within the test conduit.

I install these test conduits under any tank that may be suspected of leaking. Preferably the first step I do is to hold a vacuum on the test conduits to determine if there is any gas or liquid being leaked out. If there is none then I know that there is no leaking in this particular tank. If there is a leakage then I need to determine where that leak is located. I do this by isolating an individual grid area and first applying a vacuum to that area to see if there is any gas or liquid and determine the rate of vacuum decay when the source of vacuum is shut off. If there is gas, liquid or an unusually high rate of vacuum decay, then I am reasonably sure that I am in the vicinity of a leak. I then use positive pressure areas. Flow/pressure drop tests can confirm the location of a leak and be used to estimate the area or size of the leak hole.

I have conducted several types of experiments using both positive and negative pressure. The gas is well controlled and the location of the hole is precisely known. Using positive pressure areas, the gas flow charts are used to determine whether a leak is present.

If I detect a leak I then use special isolating means to isolate the area of the tank where the leak is so that I can inject a sealant such as an epoxy into that area and sufficiently confine the pressure on the sealant so that it will protrude through the hole where the leak is in the tank bottom. I maintain pressure on the sealant until it has set.

It thus is one object of my invention to have a method and apparatus whereby one can determine if a leak occurs in the bottom of a storage tank and the location of the leak.

Another object is to determine the size of the leak.

Another object is to disclose a method for repairing the leak.

DETAILED DESCRIPTION OF THE PREFERRED EMBODIMENT

Under tank perforated test conduits and lances can be used with the method portion of my invention to determine whether a tank leaks, where the leak is located and the approximately hole size. In addition action may be taken to repair the leak and mark it for easy identification when the internal tank inspection is made.

Figures 1, 4:
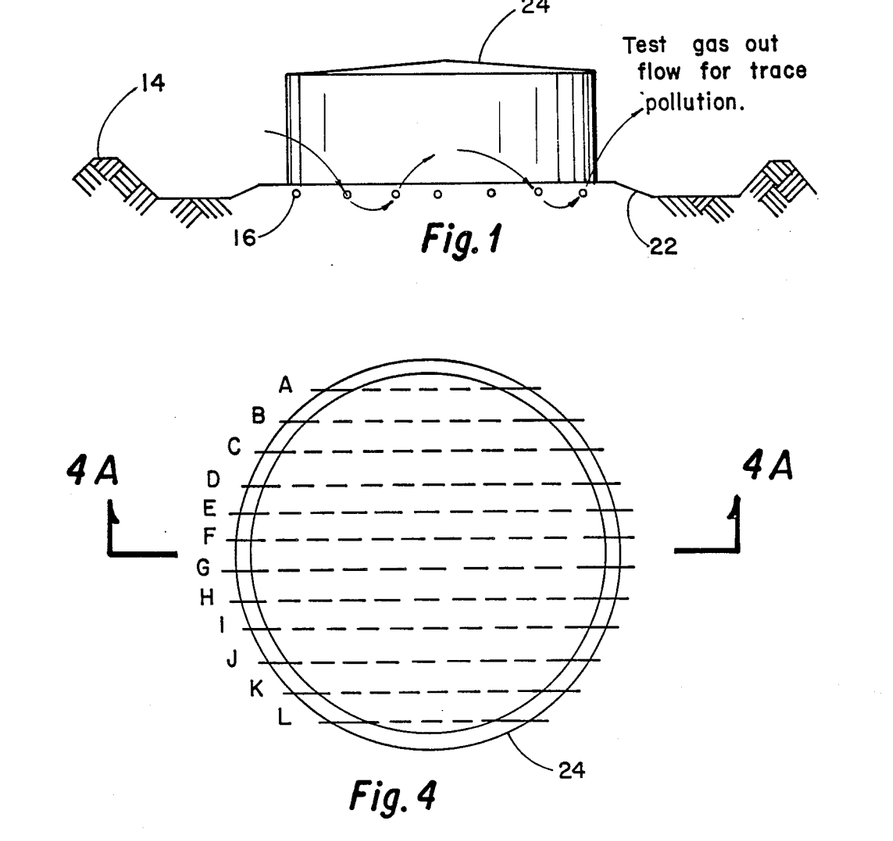
FIG. 1 illustrates a typical gas test technique.
FIG. 4 illustrates a plurality of parallel perforated test conduits beneath a storage tank.

As shown in FIG. 1 a tank 24 rests on ground layer 22. This layer may be clean river sand of a known size or washed crushed rock to keep the corrosion of the tank bottom side as limited as possible. A dike 14 surrounds the tank 24 for safety reasons. Beneath the tank 24, and positioned in soil 22, in a plurality of test conduits 16. The gas may flow inwardly through one test conduit, through the perforation therein, and out another test conduit and may generally follow the arrows shown in the drawing. In any event, the flow direction is certain and by the use of my system, which I will explain, the particular area of the soil 22 through which the gas flow is a known isolated area.

Figure 5:
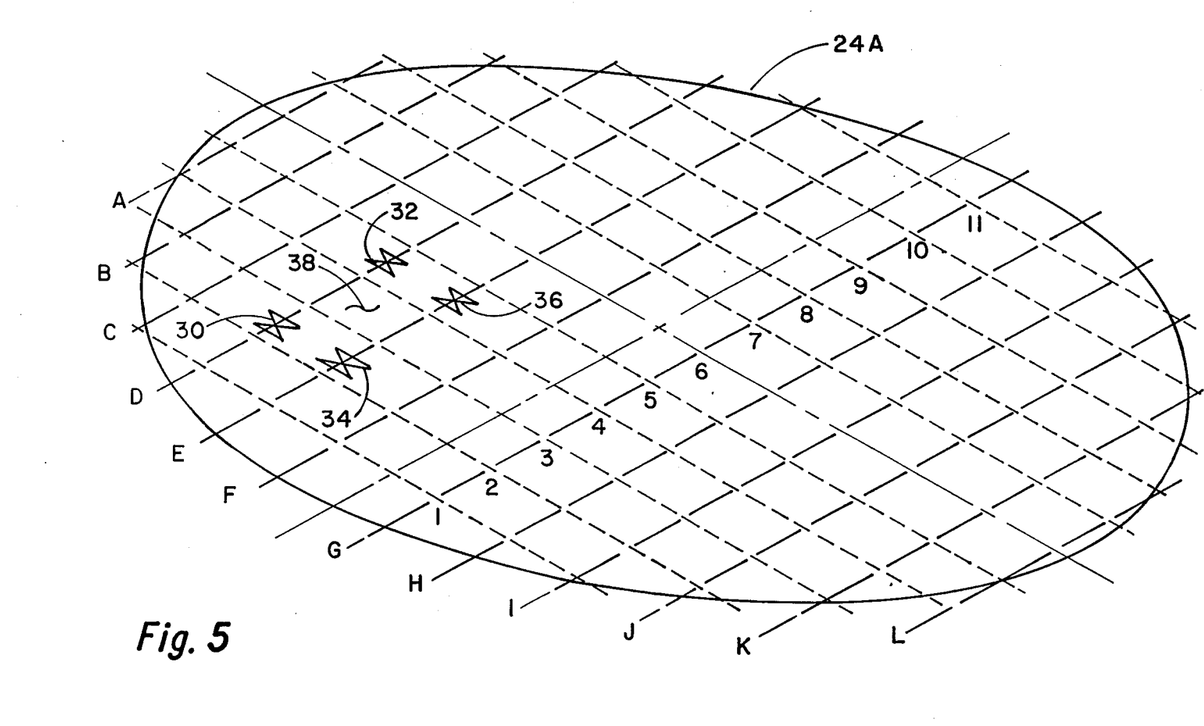
FIG. 5 illustrates an underground grid system defined by the test conduits of FIG. 4.

Attention is now directed to FIG. 4 which shows a specific arrangement of perforated conduits. Shown in FIG. 4 is tank 24 and a plurality of test conduits A through L. These are preferably parallel. These test conduits are all perforated with the perforation being a selected distance apart. In this regard attention is directed to FIG. 5. There the perforation of the various underground test conduits are aligned on lines indicated as 1, 2, 3, 4, 5, 6, 7, 8, 9, 10, 11. This encompasses the entire tank bottom outlet outline 24A. Other arrangements of the test conduits A to L may be made with the perforations so that a grid system can be obtained. However, it is believed that the parallel test conduits is the easiest arrangement to make. By inserting piston valves 30 and 32 into test conduit D and piston valve 34 and 36 into test conduit E, I can isolate an area 38 which is defined by these piston valves. The conduit arrangement for injecting and removing gas from this isolated area will now be described.

Figure 6:
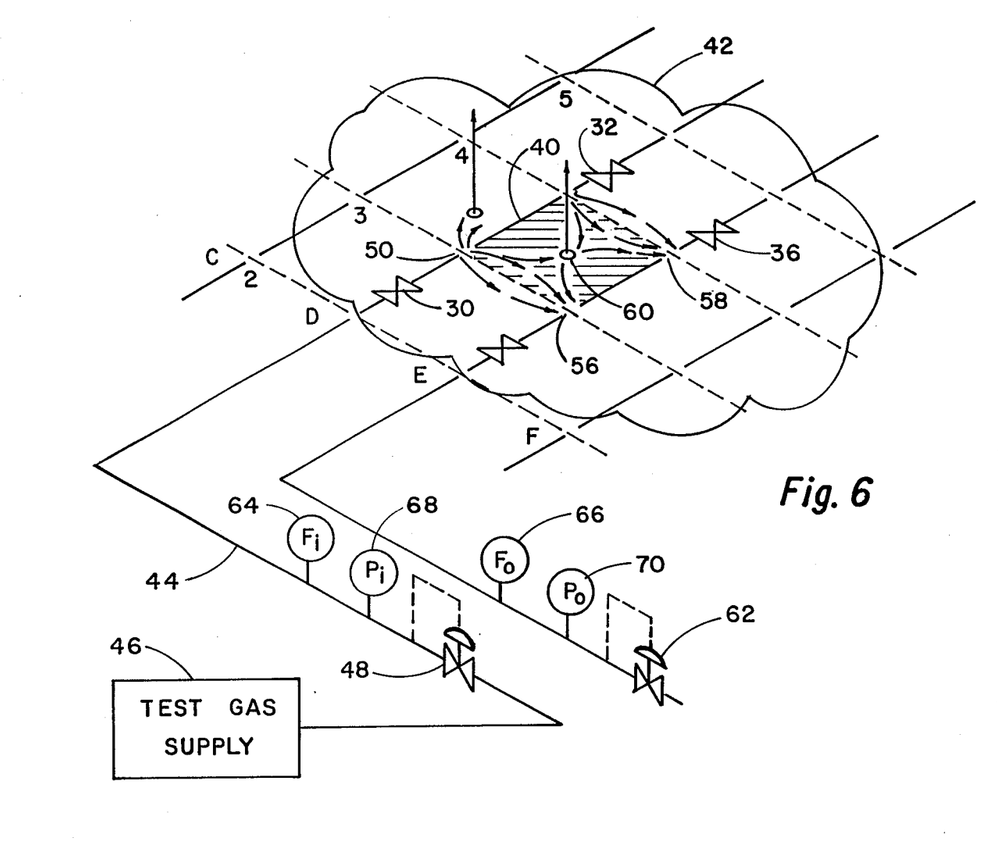
FIG. 6 illustrates a unit area in the grid system of FIG. 5.

Attention is next directed to FIG. 6 which shows a primary test area 40 and a secondary test area 42. A first conduit 44 supplies positive pressure from a test gas supply source 46 to pressure control valve 48 through test conduit D and through perforation 50 which is located between valves 30 and 32 in test conduit D. The gas flows out of this isolated area through perforations 56 and 58 in test conduit E. If there is a leak at point 60 which is within the isolated area, some of the gas will flow up through the leak 60 into the tank, if there is adequate pressure, and some gas will flow out test conduit E which has a regulator 62 which is used to maintain a static pressure under the tank. A meter 64 is used to determine flow $F_i$. A second meter 66 is in test line E to determine the flow $F_o$ out. A pressure meter 68 is in line D and a second pressure meter 70 is in line E to determine the pressure of the fluid flowing out. Meter 68 determines a pressure of the fluid flowing in. This shows how a sectioned area of the soil just beneath the tank floor can be isolated and identified for testing. The test conducted on each isolated area is also recorded and a comparison from test section to test section is made. Both positive and negative gas flow tests can be made when in the isolated section.

Figure 7:
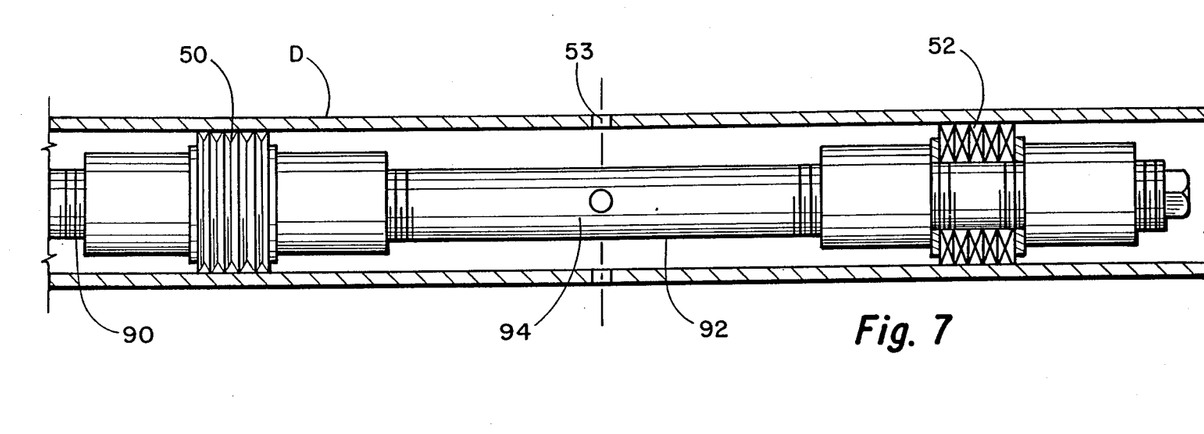
FIG. 7 illustrates, partly in cross-section, a small section of perforated test conduit with isolating valves inserted.

Attention is now directed to FIG. 7 which shows piston valves 50 and 52 inside test conduit D. In the particular arrangement shown, the space between piston valves 50 and 52 has been shortened so that there is only one perforation 53 in the wall of test conduit D therebetween. If desired the distance between the valve could be such that two perforations or many perforations could be isolated instead of one. Piston valves 50 and 52 may be rubber, urethane, or neophrene washers which are on the outside of a hollow lance 90. These pistons are sized so that they have a tight fitting contact with the interior of test conduit D. A nipple 92 with perforation 94 is between piston valves 50 and 52. The piston valves may be inserted into the test conduit D by shoving on an inner gas lance 90. By keeping measurements of the length shoved in or pulled out, one knows exactly where perforation 94 is. The valves are replaced, relocated or removed by pushing or pulling on lance 90. Fluid is flowed through lance 90 either in or out as required. Valves 30 and 32 and valves 34 and 36 are the same as valves 50 and 52 and associated conduits.

Figure 2:
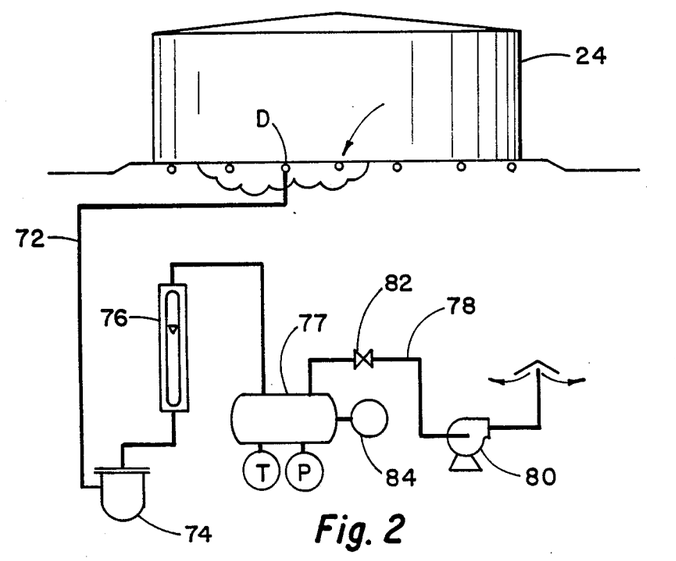
FIG. 2 is a schematic flow diagram of a vacuum test according to my invention.

In operation I first conduct a vacuum test using the equipment shown in FIG. 2. Shown therein is the test conduit D which is connected by a conduit 72 through to filter and demister 74 to a flow meter 76. The fluid from the flow meter flows into sample chamber 77 and a conduit 78 connects the outlet of sample chamber 77 and vacuum pump 80. A valve 82 is in conduit 78. With valve 82 open a vacuum is applied to the system and gas which accumulates in chamber 77 is tested by an explosion meter 84 to determine whether or not any hydrocarbon gas is in the area in which the vacuum is applied. If there is no explosive gas collected then there is no leak in that isolated area. This is true because the soil subgrade beneath the tank was free of hydrocarbon when the tank was constructed. Therefore, a sample is pulled from the soil from a section of the tank bottom will not contain any hydrocarbon vapors until a leak in the bottom of the tank has developed. After the leak has developed, it must be detected, located and repaired. Although the vacuum test is positive, it may not be totally accurate. I vacuum test this particular area again until all hydrocarbon vapors have been ventilated from the soil. One can close valve 82 and measure the rate of vacuum decay which would be important if combustible material is found. This would help to decide whether it is a new leak or an old leak that has caused the gases presence because of an old leak that has been repaired. At this time the pressure test technique, which I will shortly explain, may be used to find newly developed leaks.

Figure 8:
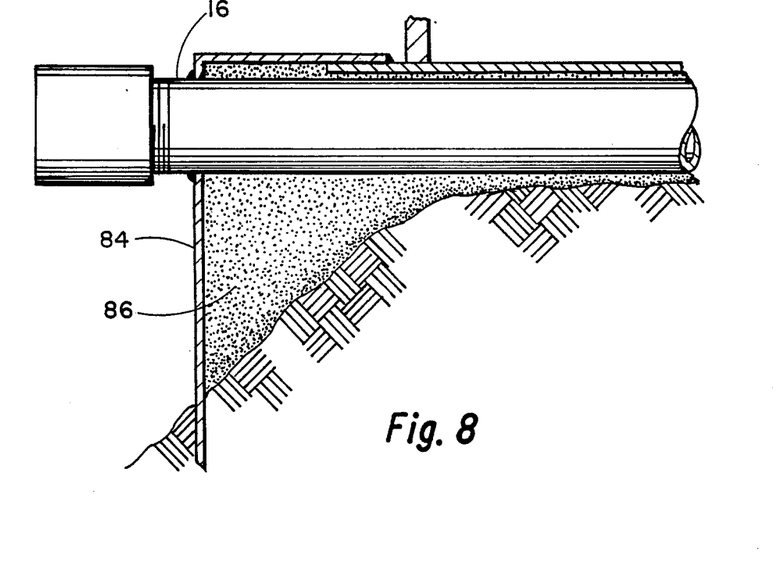
FIG. 8 illustrates one way of sealing around the outside of the ends of the test conduits as they come out of the earth outside the area of the tank.

It is important that gas coming out of the perforation of a test conduit does not follow along the outside of the conduit and escape to the atmosphere. One means of helping to prevent this is illustrated in FIG. 8. Shown thereon is a test conduit 16. A sealing skirt 84 is provided with a horizontal and a vertical section. Grout 86 is provided above the subsoil and about the end of the conduit. This is considered an effective seal against the flow of gas along the outer wall of the test conduit 16 which might otherwise escape to the atmosphere.

Most of the storage tanks in this country are, as stated above, installed on a sand base or other selected base and there is no test conduits thereunder. These test conduits can be inserted through horizontal holes drilled underneath the tank bottom. One way of accomplishing this is by the use of the "HOLE-HOG" ® available from Cimmac, Inc., 4251 South 76th East Avenue, Tulsa, Okla. 74147 which is used for drilling horizontal holes for insertion of cables under highways and the like.

Figure 3:
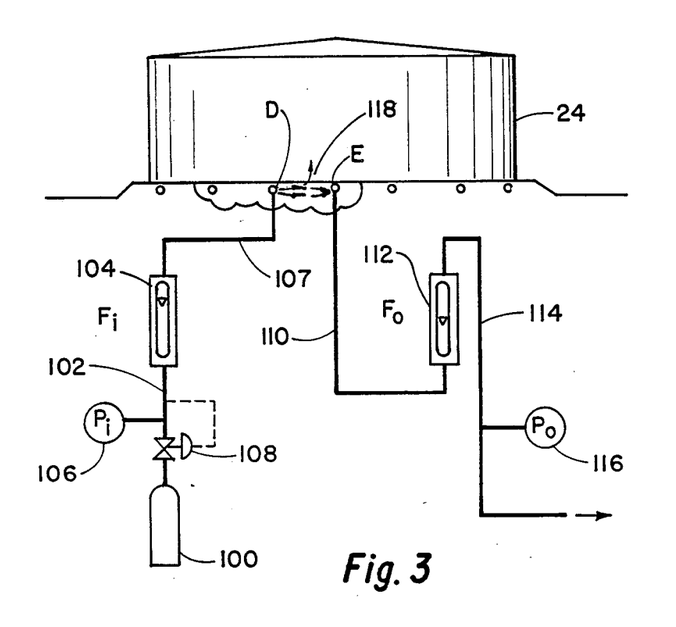
FIG. 3 is similar to FIG. 2 except that this is a schematic for a gas flow pressure test when the gas is under pressure.
Figure 4A:
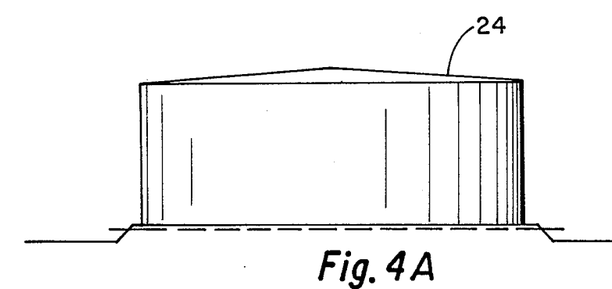

Before discussing the actual description of the testing attention is directed to FIG. 3 which shows a pressure test schematic. Shown thereon is a gas source 100 which may be a source of natural gas or nitrogen. The gas is selected so that there is no combustible mixture accumulated anywhere in the system. The output of the gas source is connected to a conduit 102 to a flow meter 104 for measuring the in-flow $F_i$. A pressure gauge 106 is provided to obtain the pressure $P_i$ and a pressure regulator valve 108 is provided. The input of the flow meter 104 is connected by piping 107 to test hollow lance in conduit D. The outlet hollow lance in gas conduit E is connected by piping 110 to a meter 112 to obtain the out-flow $F_o$ which is conducted through a piping 114 which has a pressure gauge 116 for measuring pressure. The outlet is to the atmosphere or may be compressed for reuse. Meter 104 measures an inlet flow $F_i$. In this schematic figure there may be a leak as indicated at 118 in the bottom of the tank 24.

Figure 9:
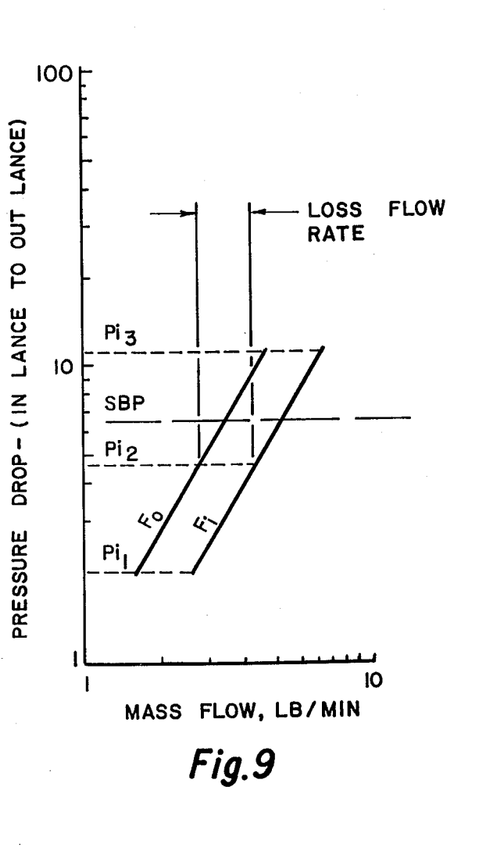
FIG. 9 shows flow pressure drop/mass flow curves showing the flow of fluid "in" and the flow of fluid "out" of the isolated area of the test conduit indicating no leak.
Figure 10:
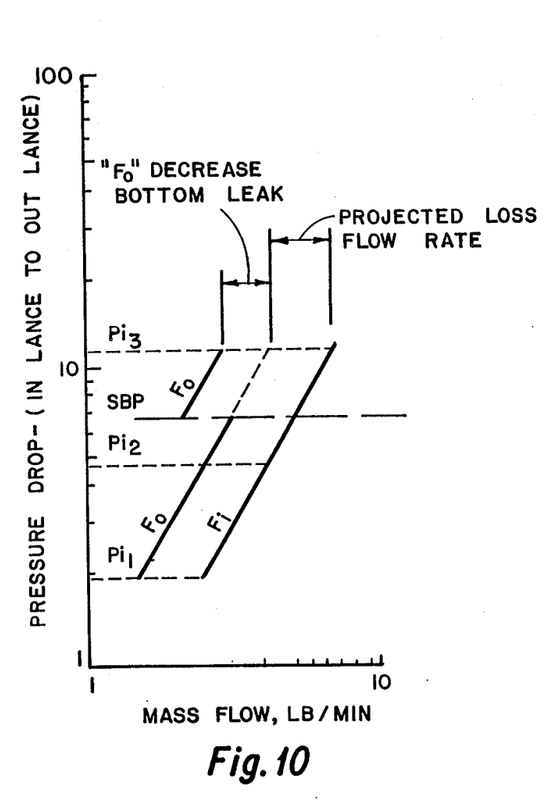
FIG. 10 is similar to FIG. 9 except in the set of curves shown there is a leak situation.
Figure 11:
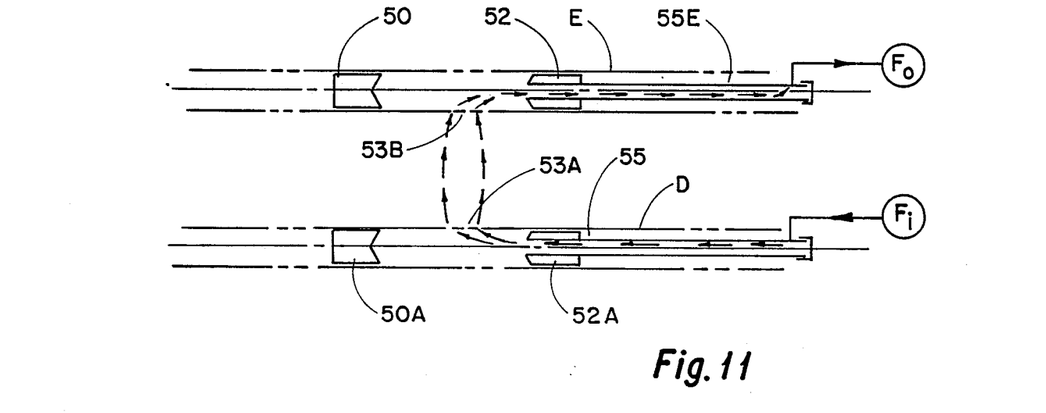
FIG. 11 illustrates the position of the piston valves in a test conduit to isolate a certain area.

Attention is now directed to FIG. 9 which shows two fluid flow curves $F_o$ and $F_i$ in which the abscissa is mass flow in pound/minute and in the ordinance is pressure drop. By using the pressure test system of FIG. 3, I obtain the flow $F_o$ and $F_i$ for pressures $P_{i1}$, $P_{i2}$ and $P_{i3}$ and $P_{o1}$, $P_{o2}$ and $P_{o3}$. I then plot those and obtain the two straight line curves shown. There is a loss flow indicated between the two curves. However, the loss is constant and in effect is that amount of gas which is needed to saturate the area under the tank which has been isolated. This shows that there is a no leak situation. This pressure test involves the use of two interrelated phenomenon, static pressure and flow/pressure drop. These tests are conducted at two or more specific pressures which are set by tank contents depth. Compressed inert gas is routed through a connection in both the "in" conduit and the "out" conduit. Pistons valves are located in the test conduits which allow pressure to be maintained only in the desired isolated test area 40 as indicated in FIG. 6. This is also shown in FIG. 11 in which the piston valves 50 and 52 are in one test conduit E and piston valves 50A and 52A are in a second test conduit D. Gas flows through the space conduit 55, out perforation 53A and into perforation 53B of test conduit E. All of the gas that goes out perforation 53A has to be accounted for. A part of it is saturated into the soil in the isolated area. The other part is conveyed out the inner lance 55E of the out test conduit E. If there is no leak then the latter two flow balances the first flow $F_i$. If there is a leak in the tank the gas will flow into the tank, assuming the pressure is adequate. This latter flow situation can be observed on the curves shown in FIG. 10. The curves are very similar to that of FIG. 9 except that the flow $F_o$ is different and takes a sharp decrease at soil bearing pressure (SBP) which is the soil bearing pressure under the tank bottom. The sharp decrease is caused by the flow of gas through the leak in the tank. This decrease is the projected loss flow rate. The gas flow pressure has to exceed SBP in order for the situation in FIG. 10 to become in effect so that the loss will be observable. The SBP can be readily obtained if one knows the head and the specific gravity of the liquid in the tank and the tank bottom steel weight. In substance I have a test procedure where I test below the SBP and a test above the SBP. When I test below the SBP I set the test pressure regulator 108 in FIG. 3 so the pressure is less than the SBP. If after pressuring up to a value less than SBP the $F_i$ remains constant this value indicates the porosity of the test zone. I prefer to repeat these steps at least at two lower pressures. I plot this on log log paper indicated in FIG. 9.

In testing above the SBP, I set the test pressure regulator 108 to a higher pressure than SBP. At the higher pressure flow in $F_i$ and flow out $F_o$ will retain the same relationship as below SBP if no tank bottom leak exists. However, if a leak exists in the tank bottom the flow out $F_o$ will not come up to the projected value. This is indicated in FIG. 10 by the abrupt shift in curve $F_o$ at pressure SBP.

If there is a leak the size of the hole can be calculated. Bernoulli's equation may be used to determine the flow of a gas through an orifice by applying a velocity coefficient and a contraction coefficient. The following equation is used:

$$Q = ACvCc \sqrt{2gh}$$

by solving for A we get $$A = \frac{Q_{leak}}{Cv\, Cc} \sqrt{2gh}$$

in these equations the symbols have the following meaning:
Q=mass flow rate
A=area of orifice (collection area of tank bottom holes)
Cv=velocity co-efficient
Cc=contraction co-efficient
g=gravitational constant
h=head in feet of fluid SBP.

I can use my invention to determine if there is a leak. If there is a leak I determine where it is located. I also use my invention to determine the size of the leak. I shall next discuss a system for repairing the leak until the tank is inspected at a later routine time.

Figure 12:
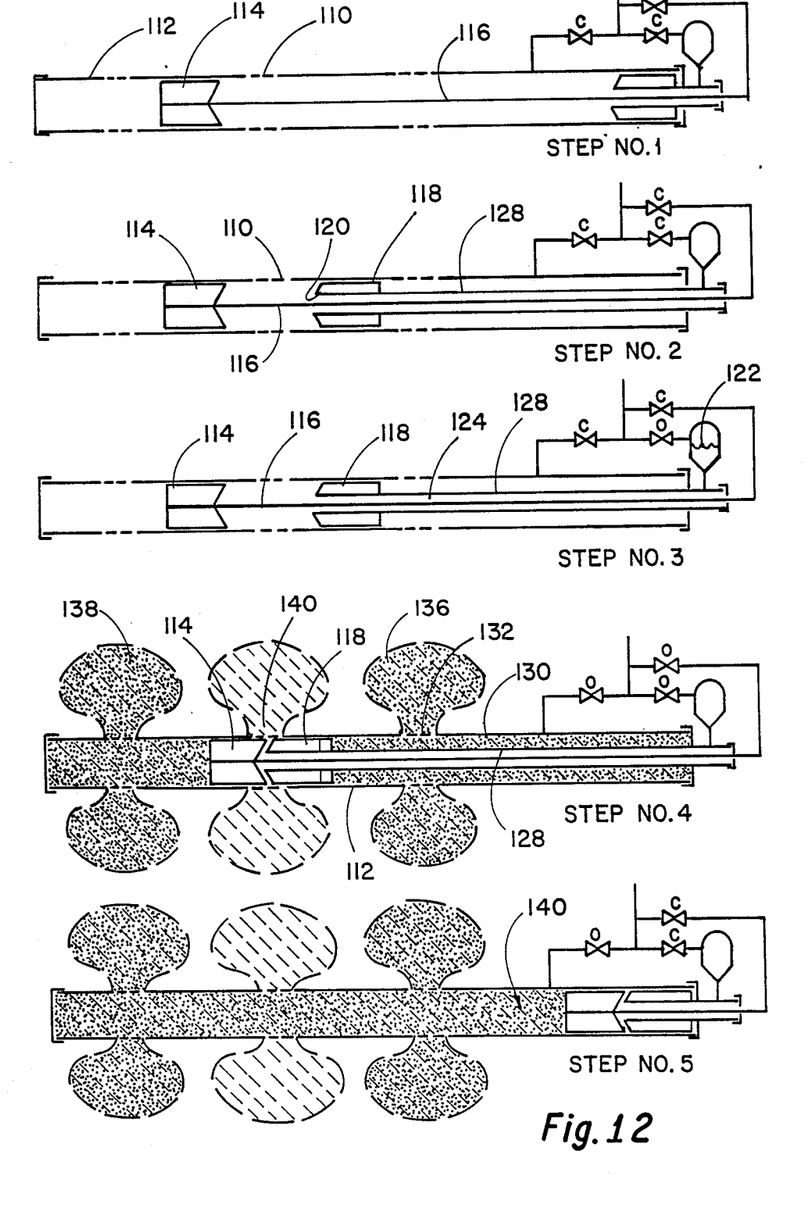
FIG. 12 illustrates the system and apparatus for injecting a resin into a selected area to plug the leak in the tank and illustrates five steps.
Figure 13:
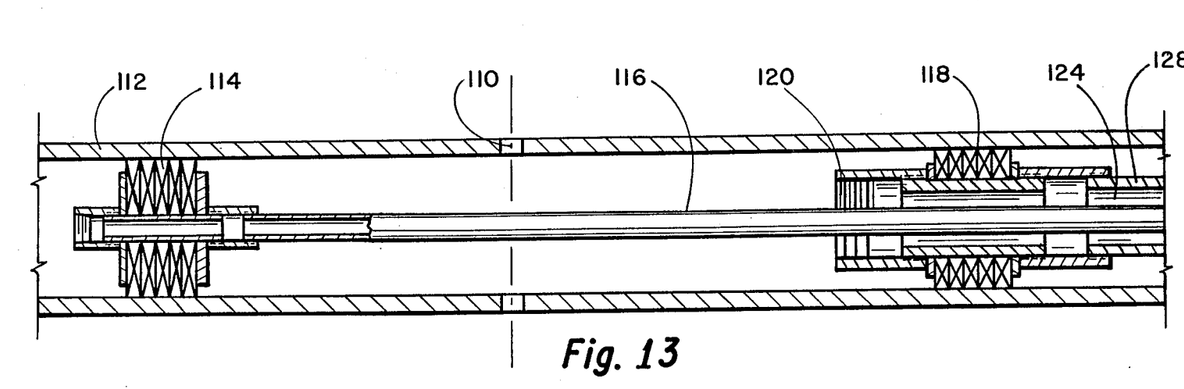
FIG. 13 illustrates, partly in section, a small section of a perforated test conduit with isolating valves and small conduits useful for use when isolating a region and injecting a resin or other sealant.

Attention is now directed to FIG. 13 which shows the mechanical arrangement of valves and conduits which are suitable for carrying out the steps of repairing the leak. This includes the conduit 112 with a perforation 110. There is a first valve 114 and a second valve 118. These valves may be quite similar to valves 50 and 52 described above insofar as the sealing with the interior of the test conduit 112 is concerned. Valve 118 is connected to a conduit 128 which can be used to push or pull valve 118 to its proper position. Valve 118 is hollow and a lance 116 which is considerably smaller than conduit or lance 128 extends therethrough and supports valve 114. Movement of lance 114 moves valve 114 independent of the movement of valve 118. Lance 116 goes through the open passage 120 of the valve 118. There is also an annulus 124 between lances 116 and 128. These various valves, conduits and lances will be referred to when I explain the steps shown in FIG. 12 which are taken to seal a leak.

Attention is now directed to FIG. 12. Shown thereon are my five steps for sealing a leak. Assuming that it has been determined from the use of my invention that the leak is in the vicinity of perforation 110 in test conduit 112. As shown in FIG. 12, step I, I insert into there first piston valve 114 by use of lance 116 which also extends through the valve 114. In Step 2, I insert second piston valve 118 which has a hollow passage 120 through which lance 116 extends. Piston valve 118 is shoved in until perforation 110 is between valves 114 and 118. In Step 3, an expoxy resin is injected from source 122 through the annulus 124 between lance 116 and lance 128 to which piston valve 118 is attached. Then the sealant such as a resin or epoxy or any suitable settable plastic is forced out the perforations 110 and will eventually protrude into the leak in the tank bottom. In Step 4, I inject a gas under pressure in the annulus 130 between lance 128 and interior wall of test lance 112. This gas goes out perforations 132. The gas is also injected through conduit 116 and out the left side of valve 114 and out perforations 134. There is thus formed a gas pressurized zone 136 and 138 which tends to keep the injected resin in place in area 140 as indicated in Step 4. The sealant is squeezed out by forcing the piston valve 118 towards piston valve 114. In Step 5 I start removing the piston valves 114 and 118 while still maintaining pressure in annulus 130 and in the interior 140 of the test conduit 112. I maintain this pressure until the resin has had a chance to set. At this time I can relieve the pressure. If I desire I can use more than one test conduit but one is considered adequate. The resin is forced between the soil and the tank bottom and extruded up through the hole(s) in the bottom of the tank. The pressure is maintained on the sealant until the sealant has had time to harden. The sealant is selected which will set in either water or hydrocarbons. The sealant extrudes through the hole to form a small pool or stalagmite on the tank floor. A properly selected resin will seal a leak for several months and possibly for as long as a year and will serve as an easily identified mark of the leak. At a scheduled inspection in the future the tank may be opened and cleaned. The location of the leak will be approximately known because the test data will be identified by the resin on the floor. An inspector can identify the area of the steel floor that should be cut out for replacement. The soil under the tank will be impregnated with resin and will come out in large pieces. All of the soil with the sealant is replaced before a new bottom steel is installed the leak detection system can be used again in the future.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A grid network system for testing for leaks in the bottom of a tank which sits on a layer of soil which comprises:
   a plurality of perforated horizontal test conduits buried under said tank in said layer,
   means to provide an isolated area relative to at least one of said perforations in at least one of said test conduits; and
   means to measure any inflow and/or outflow of fluids to or from said isolated area.

2. A system as defined in claim 1 in which said test conduits are parallel and corresponding perforations in said test conduits are aligned.

3. A grid network system for testing for leaks in the bottom of a tank which sits on a layer of soil which comprises:
   a plurality of perforated horizontal test conduits buried under said tank in said layer;
   said test conduits being parallel and corresponding perforations in said test conduits are aligned;
   an inert gas source;
   a first conduit means to inject gas from said gas source through a selected one of said test conduits to a selected perforation;
   first flow meter in said first conduit to obtain $F_i$, inflow volume;
   second conduit means to fluidly connect corresponding perforation in the second test conduit to the exterior of said tank;
   a second flow meter in said second conduit means to obtain $F_o$, out-flow volume;
   a first pressure gauge in said first conduit;
   a second pressure gauge in said second conduit.

4. An apparatus as defined in claim 3 in which said first conduit means comprises:
   a first piston valve;
   a second piston valve spaced from said first piston valve;
   a nipple connecting said first and second piston valves and a perforation in said nipple;
   one end of said second piston valve being closed;
   a passage through said second piston valve so that gas may flow through said passage and said perforation.

5. A method of testing for a leak in the bottom of a storage tank sitting on a layer of soil which comprises:
   determining the SBP (soil bearing pressure) of said layer;
   isolating an area under said bottom;
   establishing a first flow channel from said isolated area to the exterior of said layer beneath said tank;
   establishing a second flow channel from said isolated area to the exterior of said layer beneath said tank;
   flowing through said first channel, a first and a second quantity of an inert gas having a pressure $P_{i1}$ and $P_{i3}$ respectively in which $P_{i1}$ is greater than said SBP;
   measuring the flow $F_i$ through said first flow channel of said first and second quantity;
   measuring the flow $F_o$ through said second flow channel at said pressure $P_{i1}$ and again at $P_{i3}$;
   using the values of $F_i$, $F_o$, $P_{i1}$, $P_{i2}$, and $P_{i3}$ in determining the presence of a leak in said tank.

6. A method as defined in claim 5 including the steps of plotting the measured values $F_o$ and $F_i$ on log log paper.

7. A method as defined in claim 5, including the step of injecting a sealant into said isolated area and maintaining said sealant under pressure until the sealant sets.

8. A valve system for isolating a perforation in test conduits having perforations placed in the soil beneath the bottom of a storage tank which comprises:
   a first cylindrical piston valve having an axial passage therethrough;
   a second piston valve;
   a conduit connected between said first piston valve and said second piston valve, said first conduit having a perforation therein;
   said first conduit connected to the said passage; and
   a second conduit connected to passage of first piston valve.

9. A valve arrangement as defined in claim 8 in which each said piston
   valve has elastomeric material on the exterior thereof for contacting the inner wall of said test conduits.

10. A valve system as defined in claim 9 in which said second conduit is provided with a pressure gauge and with a flow meter.

11. An apparatus for testing for a leak in the bottom of a tank resting on a layer of soil which comprises:
   a plurality of perforated test conduits placed in said layer;

means to isolate a selected one of said perforations in a selected test conduit to obtain a first selected perforation;

first conduit means for injecting gas through said first selected perforation;

means to isolate a second selected perforation in a selected test conduit;

second conduit means to fluidly connect said second selected perforation to the exterior of said layer;

there is thus formed a flow channel comprising a first conduit means, said first selected perforation, said second selected perforation, and said second conduit means.

12. A method of testing for a leak in the bottom of a storage tank sitting on a layer of soil which comprises:

establishing a vacuum on at least a part of said layer under said storage tank by use of a vacuum pump;

measuring the magnitude of the vacuum thus established;

isolating said part of said layer from operation of said vacuum pump;

determining the rate of change of said vacuum;

using the rate of change of said vacuum to determine the existence or absence of a leak in the tank.

13. An apparatus for testing for a leak in the bottom of a tank resting on a layer of soil which comprises:

a plurality of perforated test conduits placed in said layer;

means to isolate a selected one of said perforations in a selected test conduit to obtain a first selected perforation;

first conduit means for injecting gas through said first selected perforations;

means to isolate a second selected perforation in a selected test conduit;

second conduit means to fluidly connect said second selected perforation to the exterior of said layer;

there is thus formed a flow channel comprising a first conduit means, said first selected perforation, said second selected perforation and said second conduit means;

first meter means to meter the flow of fluid in said first conduit means; and a second meter means to meter the flow of fluid in said second conduit means.

* * * * *